(12) United States Patent
Rao et al.

(10) Patent No.: US 9,807,033 B2
(45) Date of Patent: *Oct. 31, 2017

(54) NEIGHBOR DISCOVERY USING ADDRESS REGISTRATION PROTOCOL OVER ELMI

(71) Applicant: Cisco Technology, Inc., San Jose, CA (US)

(72) Inventors: Madhu Rao, San Jose, CA (US); Srikanthkumar Hosakote, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1030 days.

This patent is subject to a terminal disclaimer.

(21) Appl. No.: 14/073,310

(22) Filed: Nov. 6, 2013

(65) Prior Publication Data

US 2014/0064290 A1 Mar. 6, 2014

Related U.S. Application Data

(63) Continuation of application No. 12/895,553, filed on Sep. 30, 2010, now Pat. No. 8,667,097, which is a continuation of application No. 09/921,936, filed on Aug. 2, 2001, now Pat. No. 7,809,806.

(51) Int. Cl.
*G06F 15/177* (2006.01)
*H04L 12/933* (2013.01)
*H04L 12/24* (2006.01)
*H04L 12/751* (2013.01)

(52) U.S. Cl.
CPC .......... *H04L 49/15* (2013.01); *H04L 41/0803* (2013.01); *H04L 41/26* (2013.01); *H04L 45/02* (2013.01)

(58) Field of Classification Search
CPC ..... H04L 49/15; H04L 41/0803; H04L 41/26; H04L 45/02
USPC ........................................ 709/220, 245, 249
See application file for complete search history.

(56) References Cited

U.S. PATENT DOCUMENTS

| | | |
|---|---|---|
| 4,780,815 A | 10/1988 | Shiota |
| 5,140,585 A | 8/1992 | Tomikawa |
| 5,206,937 A | 4/1993 | Goto |
| 5,315,705 A | 5/1994 | Iwami et al. |
| 5,325,357 A | 6/1994 | Kimoto et al. |
| 5,608,871 A | 3/1997 | Murono |
| 5,850,397 A | 12/1998 | Raab et al. |
| 5,862,083 A | 1/1999 | Tobita et al. |
| 5,978,376 A | 11/1999 | Godse et al. |

(Continued)

OTHER PUBLICATIONS

"U.S. Appl. No. 09/921,936, Final Office Action dated Mar. 9, 2009", 19 pgs.

(Continued)

*Primary Examiner* — Oleg Survillo
(74) *Attorney, Agent, or Firm* — Meunier Carlin & Curfman LLC

(57) ABSTRACT

A system and method for mapping a network to facilitating configuration is disclosed. Address registration information is appended to an enhanced local management interface message sent between devices in a network of routers and switches. A network management system for an outside network can use that information to map out the network and configure the network as needed. The address registration information includes an Internet Protocol address and an interface index. The interface index includes both slot and port number.

20 Claims, 6 Drawing Sheets

(56) References Cited

U.S. PATENT DOCUMENTS

| | | |
|---|---|---|
| 6,195,329 B1 | 2/2001 | Kawashima |
| 6,230,009 B1 | 5/2001 | Holmes et al. |
| 6,373,853 B1 | 4/2002 | Yoshida |
| 6,418,219 B1 | 7/2002 | Planelid et al. |
| 6,457,044 B1 | 9/2002 | Iwazaki |
| 6,560,217 B1 | 5/2003 | Peirce, Jr. et al. |
| 6,567,851 B1 | 5/2003 | Kobayashi |
| 6,597,689 B1 | 7/2003 | Chiu |
| 6,639,901 B1 | 10/2003 | Katzri et al. |
| 6,661,785 B1 | 12/2003 | Zhang et al. |
| 6,665,713 B1 | 12/2003 | Hada et al. |
| 6,667,974 B1 | 12/2003 | Shigeta |
| 6,678,474 B1 | 1/2004 | Masuda et al. |
| 6,684,243 B1 | 1/2004 | Euget et al. |
| 6,753,980 B1 | 6/2004 | Sakakura et al. |
| 6,775,373 B2 | 8/2004 | Stoughton |
| 6,859,452 B1 | 2/2005 | Crooks |
| 7,145,881 B1 | 12/2006 | Dawes et al. |
| 7,222,188 B1 | 5/2007 | Ames et al. |
| 7,809,806 B1 | 10/2010 | Rao et al. |
| 2002/0009084 A1 | 1/2002 | Kalkunte |
| 2002/0009090 A1 | 1/2002 | Kalkunte et al. |
| 2002/0010791 A1 | 1/2002 | Kalkunte et al. |
| 2002/0012345 A1 | 1/2002 | Kalkunte et al. |
| 2002/0012585 A1 | 1/2002 | Kalkunte et al. |
| 2002/0013844 A1 | 1/2002 | Garrett et al. |
| 2002/0016858 A1 | 2/2002 | Sawada et al. |
| 2002/0018476 A1 | 2/2002 | Roy |
| 2002/0018489 A1 | 2/2002 | Ambe et al. |
| 2002/0023160 A1 | 2/2002 | Garrett et al. |
| 2002/0023174 A1 | 2/2002 | Garrett et al. |
| 2002/0024945 A1 | 2/2002 | Civanlar et al. |
| 2002/0055988 A1 | 5/2002 | Crooks |
| 2002/0080752 A1 | 6/2002 | Johansson |
| 2003/0165140 A1 | 9/2003 | Tang |
| 2003/0219000 A1 | 11/2003 | Magret |
| 2011/0019590 A1 | 1/2011 | Rao et al. |

OTHER PUBLICATIONS

"U.S. Appl. No. 09/921,936, Advisory Action dated Jul. 23, 2009", 3 pgs.
"U.S. Appl. No. 09/921,936, Advisory Action dated Dec. 20, 2005", 2 pgs.
"U.S. Appl. No. 09/921,936, Final Office Action dated Jun. 10, 2005", 10 pgs.
"U.S. Appl. No. 09/921,936, Final Office Action dated Nov. 9, 2007", 14 pgs.
"U.S. Appl. No. 09/921,936, Non Final Office Action dated Jun. 6, 2007", 16 pgs.
"U.S. Appl. No. 09/921,936, Non Final Office Action dated Sep. 22, 2008", 17 pgs.
"U.S. Appl. No. 09/921,936, Non Final Office Action dated Nov. 8, 2004", 11 pgs.
"U.S. Appl. No. 09/921,936, Non-Final Office Action dated Dec. 9, 2009", 18 pgs.
"U.S. Appl. No. 09/921,936, Notice of Allowance dated Jun. 1, 2010", 19 pgs.
"U.S. Appl. No. 09/921,936, Response filed Feb. 8, 2010 to Non Final Office Action dated Dec. 9, 2009", 20 pgs.
"U.S. Appl. No. 09/921,936, Response filed Feb. 22, 2005 to Non Final Office Action dated Nov. 8, 2004", 16 pgs.
"U.S. Appl. No. 09/921,936, Response filed Mar. 10, 2008 to Final Office Action dated Nov. 9, 2007", 19 pgs.
"U.S. Appl. No. 09/921,936, Response filed Jul. 2, 2008 to Restriction Requirement Jun. 3, 2008", 12 pgs.
"U.S. Appl. No. 09/921,936, Response filed Jul. 2, 2009 to Final Office Action dated Mar. 9, 2009", 16 pgs.
"U.S. Appl. No. 09/921,936, Response filed Aug. 10, 2009 to Advisory Action dated Jul. 23, 2009", 17 pgs.
"U.S. Appl. No. 09/921,936, Response filed Oct. 9, 2007 to Non Final Office Action dated Jun. 6, 2007", 22 pgs.
"U.S. Appl. No. 09/921,936, Response filed Nov. 28, 2005 to Final Office Action dated Jun. 10, 2005", 17 pgs.
"U.S. Appl. No. 09/921,936, Response filed Dec. 22, 2008 to Non Final Office Action dated Sep. 22, 2008", 20 pgs.
"U.S. Appl. No. 09/921,936, Restriction Requirement dated Jun. 3, 2008", 7 pgs.
"U.S. Appl. No. 12/895,553, Non Final Office Action dated Mar. 6, 2013", 11 pgs.
"U.S. Appl. No. 12/895,553, Notice of Allowance dated Jun. 24, 2013", 11 pgs.
"U.S. Appl. No. 12/895,553, Response filed Jun. 6, 2013 to Non Final Office Action dated Mar. 6, 2013", 11 pgs.
"Cisco Documentation—Frame Relay ELMI Address Registration", Post on Dec. 6, 2000, at http://www.cisco.com/univercd/cc/td/doc/product/software/ios121/121newft/121t/121t3/tfripar.htm.
"Integrated Local Management Interface (ILMI) Specification", Technical Committee; The ATM Forum; Version 4.0, af-ilmi-0065.000, (Sep. 1996), 103 pgs.
Hanaki, M, et al., "LAN/WAN management integration using ATM CNM interface", IEEE Network Operations and Management Symposium, vol. 1, (Apr. 15-19, 1996), 12-21.
McCloghrie, "RFC 1213 Management Information Base for Network Management of TCP/IP-based internets: MIB-II", Network Working Group, (Mar. 1991), 61 pgs.

NEIGHBOR DISCOVERY USING ADDRESS REGISTRATION PROTOCOL OVER ELMI

CROSS-REFERENCES TO RELATED APPLICATIONS

The present application is a continuation of and claims the benefit of priority to co-pending U.S. patent application Ser. No. 12/895,553, entitled "NEIGHBOR DISCOVERY USING ADDRESS REGISTRATION PROTOCOL OVER ELMI," filed on Sep. 30, 2010, which is a continuation of and claims the benefit of priority to U.S. patent application Ser. No. 09/921,936, entitled "NEIGHBOR DISCOVERY USING ADDRESS REGISTRATION PROTOCOL OVER ELMI," filed on Aug. 2, 2001, now issued as U.S. Pat. No. 7,809,806, both of which are hereby incorporated by reference in their entirety as if set forth herein.

FIELD OF THE INVENTION

The field of the invention relates to the configuration of router and switch networks.

BACKGROUND OF THE INVENTION

Currently, when a network management system (NMS) configures a router network, the NMS cannot configure any part of the network not made up of routers. Any switches that connect a router from one router network to a different router from another router network are often not recognizable to a local area network (LAN) management system (LMS). Similarly, any routers connected to a switch from a switch network are often not recognizable to the wide area network (WAN) management system (WMS) that manages the switch network. This separation creates a requirement that two separate network management systems be used to configure a cross network system. Additionally, if a switch-to-switch connection is damaged, an LMS usually cannot determine where the problem is and has little ability to reroute the connection around the damaged connection. The converse is true in that a WMS has difficulty determining router-to-router connection damage and reroute around the connection.

In identifying switches and routers, much of the difficulty arises is in the presence of slots and ports. A typical midrange WAN switch can contain up to 32 slots. While two of those slots are reserved for other purposes, up to thirty slots are available to be filled with communication cards. These communication cards contain several ports. Each of these ports can create a different connection between the switch and another communication device. The number of slots and ports can be higher or lower depending upon the model. Routers have a similar set up. The lack of knowledge about which slot and which port is being used is what makes communication between the LMS and the switches or between the WMS and the routers difficult.

Because the LMS often has no knowledge of intervening switches, one prior art way to set up a connection between two routers in two separate networks is to follow an inefficient multi-step process. First, all the routers in the first network must be set up using either a command line interface (CLI) at the router or by using the appropriate graphical user interface (GUI) at the first network's LMS. Secondly, the proper switch universal frame relay module (UFM) to UFM frame relay connection must be established using a CLI at the switch or by using a WMS. Finally, a data connection link identifier (DCLI) between the UFM and the each external router must be set up through the LMS of either network or a CLI. As shown, this method is not very efficient and far from user friendly.

SUMMARY OF THE INVENTION

A system is described that includes a network of routers. A local area network management system manages and configures the network of routers. The system also includes a network of switches. A wide area network management system manages and configures the network of switches. A connection connects a first router of the network of routers to a first switch of the network of switches. Address registration information is appended to a message sent between the first router and the first switch over the connection.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicated similar elements and in which.

DETAILED DESCRIPTION

A system and method are described for enabling a router and switch network to be mapped by a single network management system (NMS). The embodiments allow the NMS to map out the network by having the individual devices append address registration information to the enhanced local management interface (ELMI) messages sent between devices. The address registration information information is passed back through the network to the NMS, which compiles the information to create an accurate map of the network. Once this map of the network is complete, the NMS is able to configure the network as needed and diagnose problematic areas.

Figure 1:
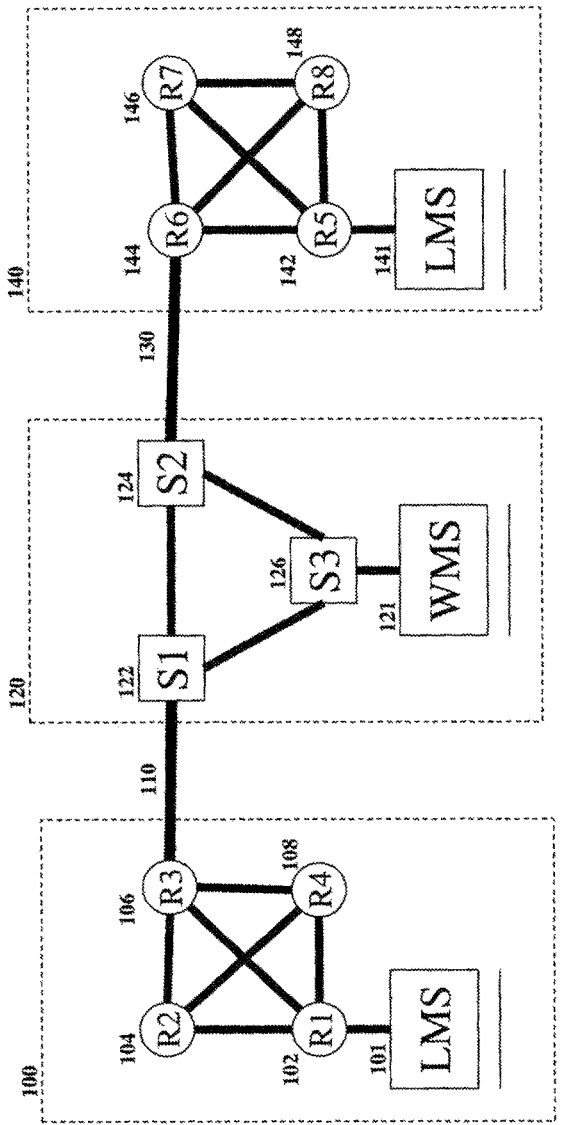
FIG. 1 illustrates in a block diagram of a router and switch network.

One embodiment of a router and switch network in which the address registration protocol could be implemented is illustrated in the block diagram of FIG. 1. A first local area network (LAN) 100 can consist of a LAN Management System (LMS) 101 and a given number of routers. Additional terminals can access the LAN via these routers. The illustrated embodiment of the first LAN includes four routers: Router 1 102, Router 2 104, Router 3 106, and Router 4 108. The number of routers in the network can be increased or decreased as required. The configuration of these routers previously could be accessed by using the LMS 101, or at the individual router using a command line interface (CLI).

The first LAN 100, in one embodiment, could be connected, via a connection line 110, to a WAN 120. In an alternate embodiment, this connection is a radio connection or some type of wireless connection. In an additional embodiment, the connection is a serial or parallel cable connection. The WAN 120 can consist of a WAN Management System (WMS) 121 and a given number of switches. The illustrated embodiment of the WAN includes three switches: Switch 1 122, Switch 2 124, and Switch 3 126. The number of switches in the network can be increased or decreased as required. The configuration of these switches could be accessed by using a WMS 121 or at the switch using a CLI.

The WAN 120, in a further embodiment, could then be connected, via a second connection line 130 or a wireless connection, to a second LAN 140. The second LAN would also consist a second LMS 141 and a further group of routers. The illustrate embodiment of the second LAN includes four more routers: Router 5 142, Router 6 144, Router 7 146, and Router 8 148. The number of routers in the second LAN is not dependent on the number of routers in the first LAN. The number of routers can be increased or decreased as the situation requires. The configuration of these routers previously could be accessed by using the first LMS 101, the second LMS 141, or at the individual router using a command line interface (CLI).

Figure 2A:
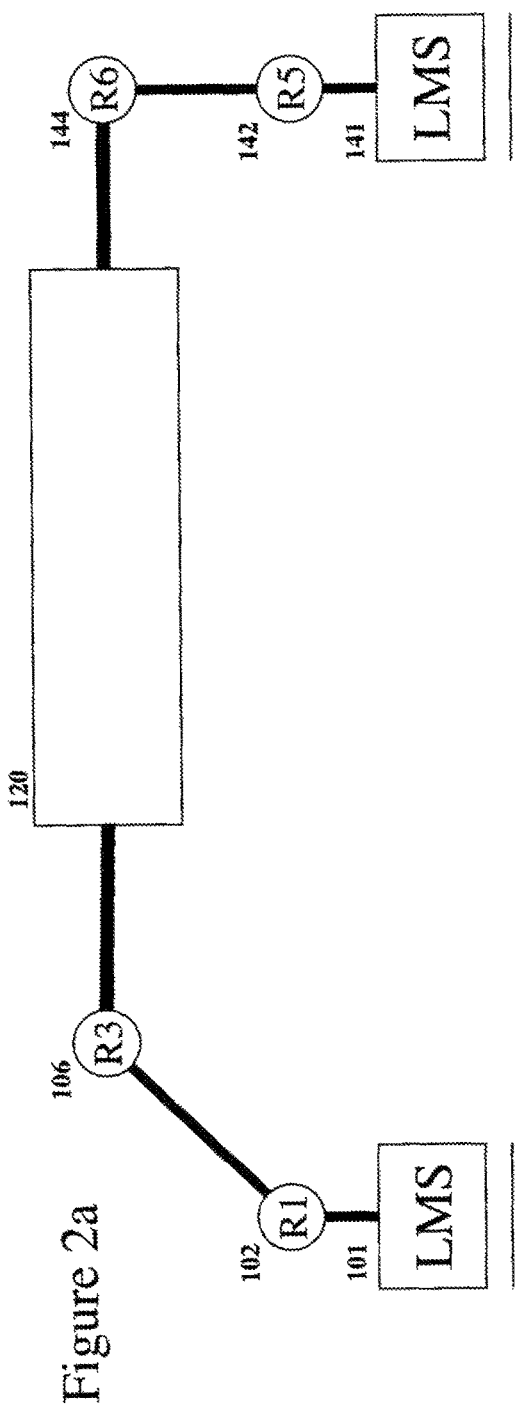
FIG. 2a illustrates in a block diagram of the network as seen by the LMS.
Figure 2B:
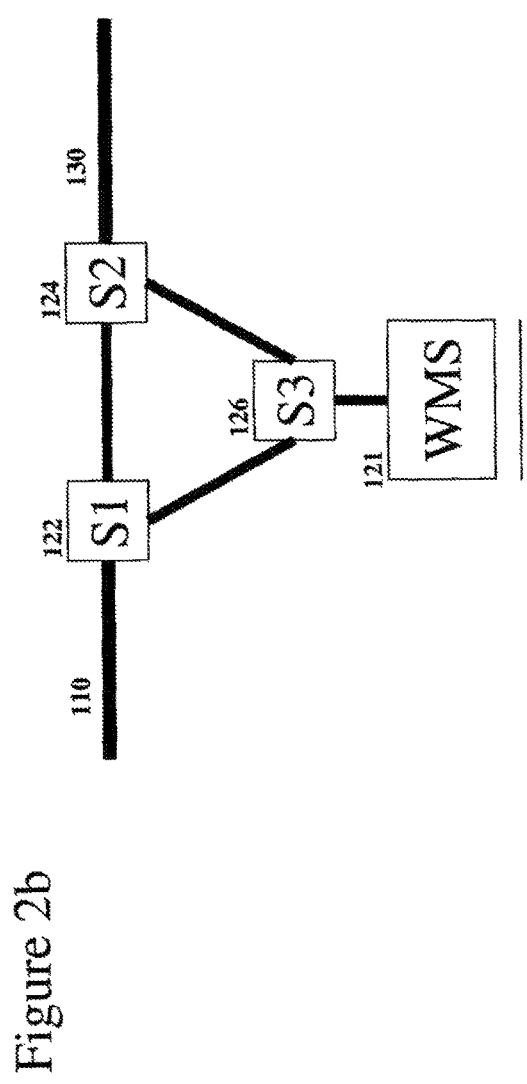
FIG. 2b illustrates in a block diagram of the network as seen by the WMS.

The way that a network management system currently views a router and server network is illustrated in FIG. 2a and FIG. 2b. FIG. 2a illustrates how an LMS 101 views a router network. The first LMS 101 is able to access any of the routers in the first LAN 100. As illustrated in FIG. 1, the LAN 100 is connected at Router 3 106 to Switch 1 122 of the WAN 120. While the LMS 101 is able recognize that Router 3 106 is connected to something, the LMS 101 is unable to distinguish what the router 106 is connected to. In a further embodiment, Router 6 144 of the second LAN 140 is connected to the WAN via a connection 130 with Switch 2 124, as shown in FIG. 1. As shown in FIG. 2a, the first LMS 101 is able to recognize Router 6 144. However, the first LMS is unable to recognize how Router 3 106 and Router 6 144 are connected. Through Router 6 144, the first LMS 101 can access any of the routers in the second LAN 140. Conversely, the second LMS 141 can access any of the routers in the first LAN 100 through Router 3.

FIG. 2b illustrates how a WMS 121 currently views a network. The WMS 121 is able to recognize the switches present in the WAN 120. The WMS 121 can also recognize that the switches are connected to something outside the WAN 120. However, the WMS is unable to recognize what the switches are connected to. This makes configuring the network and curing connection problems difficult.

Figure 3:
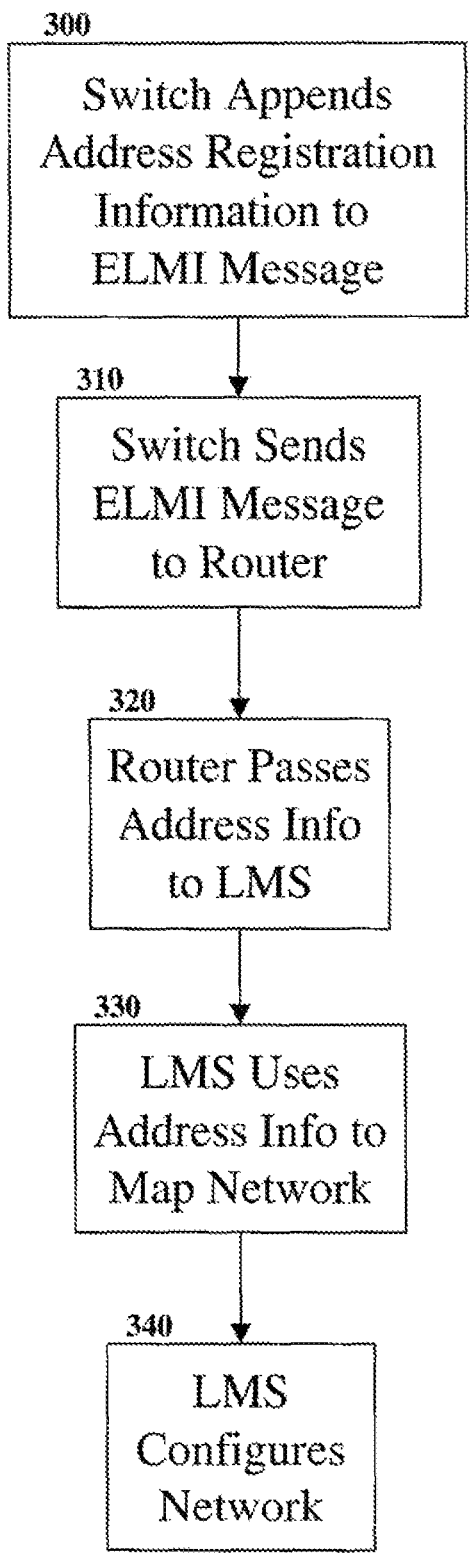
FIG. 3 illustrates in a flowchart the method used by the LMS to map the network.

The address registration information will make it possible for a NMS to determine what switches and routers configure the network. One embodiment of this method, as applied to an LMS, is illustrated by the flowchart in FIG. 3. A switch 122 in the WAN 120 appends address registration information to a message at block 300. In one embodiment, the message is an ELMI message. The switch 122 then sends the message to a router 106 in the LAN at block 310. The message can be sent when one of the networks is first configured or after a change in configuration has occurred. In a further embodiment, the message can be sent every ten minutes, or some other set interval of time, to monitor the configuration. The router 106 will then pass this address information on to the LMS at block 320. The LMS 101 uses this information to map out the network at block 330. Once the network has been mapped out, the LMS 101 can then configure the entire network as desired at block 340.

Figure 4:
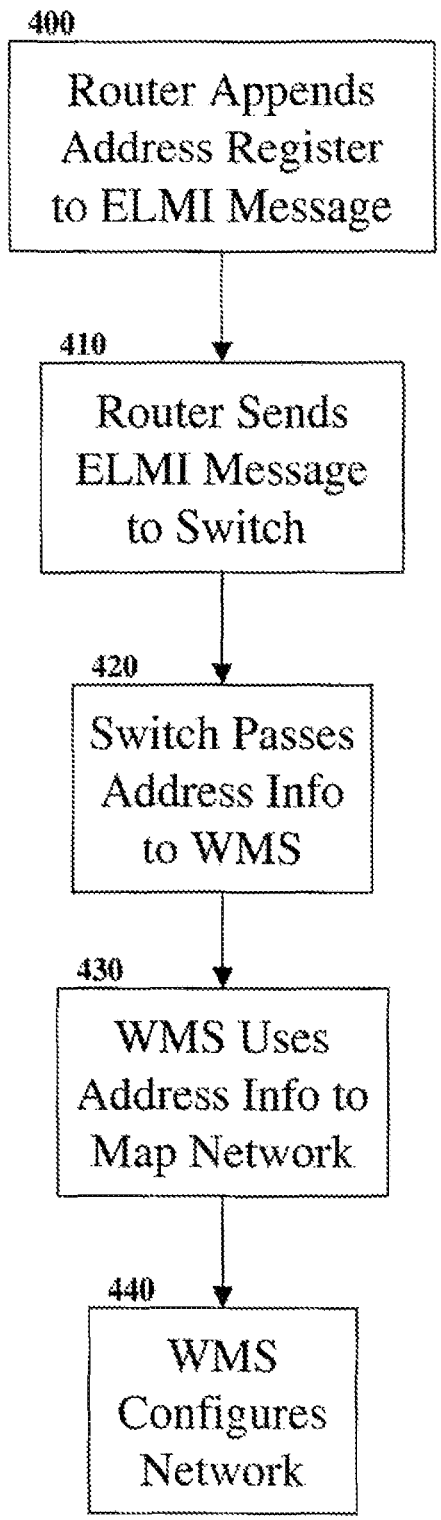
FIG. 4 illustrates in a flowchart the method used by the WMS to map the network.

A converse embodiment, allowing the system to be mapped and configured by a WMS, is illustrated by a flowchart in FIG. 4. A router 144 appends address registration information to a message at block 400. Again, in one embodiment, the message is an ELMI message and the timing and frequency of the message can be tailored to suit the circumstances. The router 144 sends the message to a switch 124 in the WAN at block 410. The switch 124 passes the address information on to the WMS at block 420. The WMS 121 uses this information to map out the network at block 430. Once the network has been mapped, the WMS 121 can then configure the network as desired at block 440. Usually, the LMS is more familiar to the management information systems (MIS) administrators who will be configuring the network. Therefore, the LMS is more likely than the WMS to be used for configuration purposes.

Figure 5:
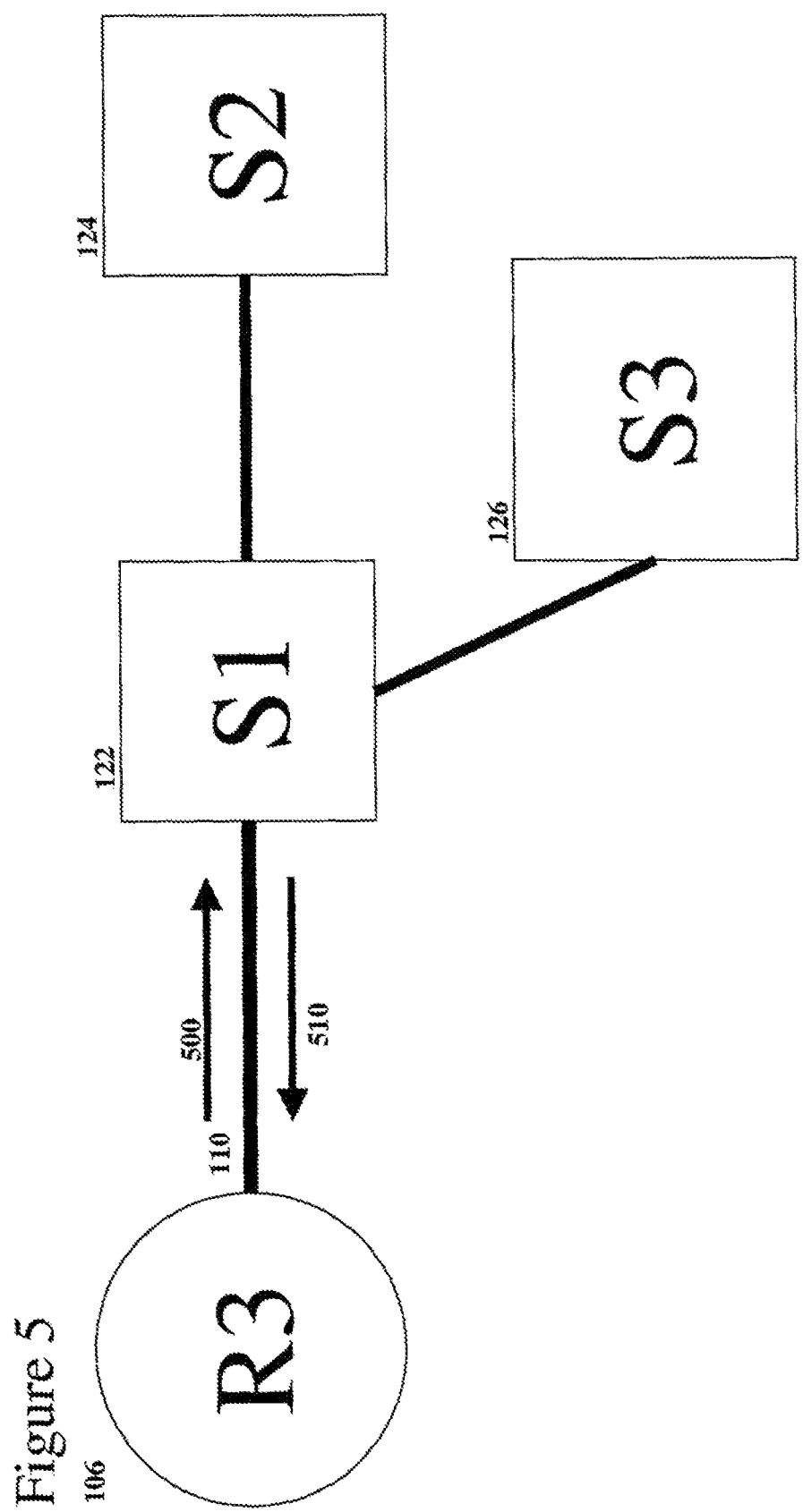
FIG. 5 illustrates in a block diagram the transaction between the router and the switch.

FIG. 5 illustrates the transaction of address information between switches and routers, in one embodiment. The router 106 appends address registration information to a message 500 being sent to the switch 122. The switch 122 appends address registration information to a message 510 being sent to the router 106. Each switch contains a management information base (MIB). Once the router has acquired the proper address information from Switch 1 122, the LMS 101 can access the MIB in that switch 122. Using this information, the LMS can then access the MIB of the switches 124 and 126 connected to Switch 1 122. The LMS then accesses each of the adjacent switches 124 and 126. In this way, the LMS builds a map of the entire switch network of the WAN.

Figure 6:
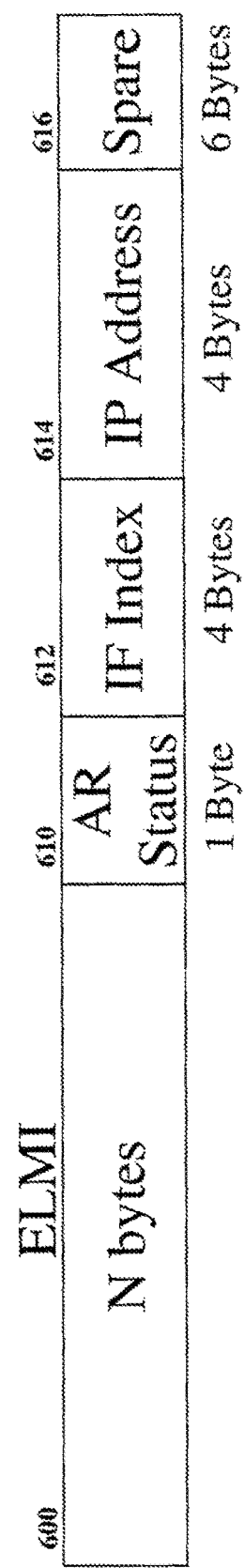
FIG. 6 illustrates the ELMI message with the Address Registration information appended.

One embodiment of the datapacket used to send address information is illustrated in FIG. 6. An ELMI message 600 is normally sent between the routers and the switches to coordinate management of the ports and connections of the network. Other messages can be used in place of an ELMI message. Address registration information is appended onto the message. In one embodiment, the address registration includes an address registration (AR) status 610, an interface index (ifIndex) 612, and an Internet protocol (IP) address 614 to facilitate the ability of an outside NMS to map and configure the network. In a further embodiment, the ifIndex includes a port number and a slot number. In one embodiment, the AR status alerts the inquiring device what the status of the address registration is for the device being inquired. The AR status currently signals four messages. ELMI AR messages disabled on the interface, represented in this embodiment by binary 00, indicates the router/switch are talking to a device that does not support AR. ELMI AR enabled on the interface, represented in this embodiment by binary 01, indicates IFindex and IP address can be used to specify the link between the switch and the router. Additionally, the AR status can indicate, in this embodiment by binary 10, a valid IP address and Ifindex are configured on the interface, but the user disabled exchange of IP address and Ifindex with the neighbor. The user does this typically for security reasons. Asynchronous Version status message, represented in this embodiment by binary 11, indicates when the IP address or Ifindex is changed on the switch side. Normally the Address Registration information is exchanged at default intervals. Rather than wait for the default interval, this type of message indication can be sent with the new values to take effect immediately. In an additional embodiment, a few spare bytes 616 are included in the address registration information. These spare bytes can be used for error checking or if some expansion of the information contained in the address registration information is required.

In a further embodiment, the ELMI provides an infrastructure enabling an exchange of information between the routers and the WMS or switches and the LMS. Traffic shaping information can be passed on from the router to the WMS, which then uses that information to deduce appropriate values for traffic shaping on that router's adjacent connected switch.

The method described above can be stored in the memory of a computer system or network (e.g., set top box, video recorders, etc.) as a set of instructions to be executed. The instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented by additional computer and/or machine readable media, such as discrete hardware components as large-scale integrated circuits (LSI's), application-specific integrated circuits (ASIC's), firmware such as electrically erasable programmable read-only memory (EEPROM's); and electrical, optical, acoustical and other forms of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method comprising:
    at a first network management system comprising a processor and memory,
    acquiring address registration information via a first edge device of a first network from a second edge device of a second network, the first network management system connected to and managing the first network, the first network comprising a first plurality of devices including the first edge device, the second network comprising a second plurality of devices including the second edge device, the devices of the first plurality of devices being of a first type of device, the devices of the second plurality of devices being of a second type of device different from the first type of device, the second network being connected to and managed by a second network management system separate from the first network management system, the first network management system being indirectly connected to the second network via the first network;
    accessing a management information base (MIB) associated with the second edge device using the address registration information;
    accessing other MIBs using information from the MIB associated with the second edge device, each of the other MIBs associated with a corresponding one of other devices of the second network;
    building a map of entire devices of the second network based on the accessed information from the MIB and the other MIBs; and
    configuring the second network using the map of entire devices of the second network.

2. The method of claim 1, wherein the devices of the first plurality of devices are switches and the devices of the second plurality of devices are routers.

3. The method of claim 2, wherein the first network is a wide area network (WAN) and the second network is a local area network (LAN).

4. The method of claim 1, wherein the address registration information comprises an interface index associated with the second edge device.

5. The method of claim 4, wherein the interface index comprises a slot number from which a message was sent to the first edge device, the address registration information being appended to the message.

6. The method of claim 4, wherein the interface index comprises a port number from which a message was sent to the first edge device, the address registration information being appended to the message.

7. The method of claim 1, wherein the address registration information comprises an Internet Protocol (IP) address.

8. A system comprising:
    a first network management system connected to and managing a first network that includes a first plurality of devices, a first edge device of the first network being connected to a second edge device of a second network that includes a second plurality of devices, the devices of the first plurality of devices being of a first type of device, the devices of the second plurality of devices being of a second type of device different from the first type of device, the second network being connected to and managed by a second network management system separate from the first network management system, the first network management system being indirectly connected to the second network via the first network, the first management system comprising a processor and memory and being configured to:
    acquire address registration information via the first edge device from the second edge device;
    access a management information base (MIB) associated with the second edge device using the address registration information;
    access other MIBs using information from the MIB associated with the second edge device, each of the other MIBs associated with a corresponding one of other devices of the second network;
    build a map of entire devices of the second network based on the accessed information from the MIB and the other MIBs; and
    configure the second network using the map of entire devices of the second network.

9. The system of claim 8, wherein the devices of the first plurality of devices are switches and the devices of the second plurality of devices are routers.

10. The system of claim 9, wherein the first network is a wide area network (WAN) and the second network is a local area network (LAN).

11. The system of claim 8, wherein the address registration information comprises an interface index associated with the second edge device.

12. The system of claim 11, wherein the interface index comprises a slot number from which a message was sent to the first edge device, the address registration information being appended to the message.

13. The system of claim 11, wherein the interface index comprises a port number from which a message was sent to the first edge device, the address registration information being appended to the message.

14. The system of claim 8, wherein the address registration information comprises an Internet Protocol (IP) address.

15. A non-transitory computer-readable storage medium storing instructions that, when executed by a processor, cause the processor to perform operations at a first network management system comprising a processor and a memory, the operations comprising:

acquiring address registration information via a first edge device of a first network from a second edge device of a second network, the first network management system connected to and managing the first network, the first network comprising a first plurality of devices including the first edge device, the second network comprising a second plurality of devices including the second edge device, the devices of the first plurality of devices being of a first type of device, the devices of the second plurality of devices being of a second type of device different from the first type of device, the second network being connected to and managed by a second network management system separate from the first network management system, the first network management system being indirectly connected to the second network via the first network;

accessing a management information base (MIB) associated with the second edge device using the address registration information;

accessing other MIBs using information from the MIB associated with the second edge device, each of the other MIBs associated with a corresponding one of other devices of the second network;

building a map of entire devices of the second network based on the accessed information from the MIB and the other MIBs; and configuring the second network using the map of entire devices of the second network.

16. The non-transitory computer-readable storage medium of claim 15, wherein the devices of the first plurality of devices are switches and the devices of the second plurality of devices are routers.

17. The non-transitory computer-readable storage medium of claim 16, wherein the first network is a wide area network (WAN) and the second network is a local area network (LAN).

18. The non-transitory computer-readable storage medium of claim 15, wherein the address registration information comprises an interface index associated with the second edge device.

19. The non-transitory computer-readable storage medium of claim 18, wherein the interface index comprises a slot number from which a message was sent to the first edge device, the address registration information being appended to the message.

20. The non-transitory computer-readable storage medium of claim 18, wherein the interface index comprises a port number from which a message was sent to the first edge device, the address registration information being appended to the message.

* * * * *